US009862852B2

(12) United States Patent
Mugisawa et al.

(10) Patent No.: US 9,862,852 B2
(45) Date of Patent: Jan. 9, 2018

(54) AMORPHOUS FLUORINE-CONTAINING RESIN COMPOSITION AND A MANUFACTURING METHOD OF THIN FILMS

(71) Applicant: DUPONT MITSUI FLUOROCHEMICALS CO LTD

(72) Inventors: Masaki Mugisawa, Shizuoka (JP); Yuji Mochizuki, Shizuoka (JP); Jeong Chang Lee, Shizuoka (JP)

(73) Assignee: DUPONT-MITSUI FLUOROCHEMICALS CO., LTD., Tokyo (JP)

( * ) Notice: Subject to any disclaimer, the term of this patent is extended or adjusted under 35 U.S.C. 154(b) by 0 days.

(21) Appl. No.: 14/430,622

(22) PCT Filed: Sep. 26, 2013

(86) PCT No.: PCT/IB2013/002818
§ 371 (c)(1),
(2) Date: Mar. 24, 2015

(87) PCT Pub. No.: WO2014/049444
PCT Pub. Date: Apr. 3, 2014

(65) Prior Publication Data
US 2015/0259558 A1 Sep. 17, 2015

(30) Foreign Application Priority Data

Sep. 27, 2012 (JP) ................. 2012-215135

(51) Int. Cl.
| | |
|---|---|
| C08F 214/26 | (2006.01) |
| C08J 3/11 | (2006.01) |
| C09D 127/18 | (2006.01) |
| C08J 3/09 | (2006.01) |
| C09D 127/12 | (2006.01) |

(52) U.S. Cl.
CPC ........ C09D 127/18 (2013.01); C08F 214/262 (2013.01); C08J 3/093 (2013.01); C09D 127/12 (2013.01); C08J 3/11 (2013.01); *C08J 2327/12* (2013.01); *C08J 2327/18* (2013.01); *Y10T 428/31544* (2015.04)

(58) Field of Classification Search
None
See application file for complete search history.

(56) References Cited

U.S. PATENT DOCUMENTS

| | | | |
|---|---|---|---|
| 3,968,399 A | 7/1976 | Jordan | |
| 5,919,878 A * | 7/1999 | Brothers | ............. C08F 214/262 428/421 |
| 6,228,570 B1 * | 5/2001 | Freeman | .................. G03C 1/74 430/140 |
| 6,248,623 B1 | 6/2001 | Hrivnak et al. | |
| 2001/0051700 A1 | 12/2001 | Matsukura et al. | |
| 2009/0291219 A1 | 11/2009 | Larichev | |
| 2011/0282104 A1 | 11/2011 | Bartelt et al. | |
| 2012/0024319 A1 | 2/2012 | Bartelt et al. | |
| 2012/0028864 A1 * | 2/2012 | Bartelt | ..................... C09K 3/30 508/582 |

FOREIGN PATENT DOCUMENTS

| | | |
|---|---|---|
| JP | 11-246726 A | 9/1999 |
| WO | 96/22356 A1 | 7/1996 |
| WO | 98/11146 A1 | 3/1998 |
| WO | 00/01758 A1 | 1/2000 |
| WO | 2009/147970 A1 | 5/2009 |
| WO | 2012/016094 A1 | 2/2012 |

OTHER PUBLICATIONS

PCT International Search Report and Written Opinion dated Mar. 6, 2014.

* cited by examiner

*Primary Examiner* — Ramsey Zacharia
(74) *Attorney, Agent, or Firm* — Keith W. Palmer

(57) ABSTRACT

[Object of this invention] To provide the amorphous fluorine-containing resin composition that has superior film-forming ability, and has a small impact on the global environment due to its very small global warming potential, and can fully satisfy the requirement from the perspective of the environmental protection of the earth; and to provide the article that contains the coating that is formed from the thin films that are made from this amorphous fluorine-containing resin. composition.

[Means to solve the problems] The amorphous fluorine-containing resin composition that dissolves the amorphous fluorine-containing resin in alkoxy fluoroalkene. This invention also provides the article that contains the coating that is formed from the thin films that are made from this amorphous fluorine-containing resin composition.

4 Claims, No Drawings

AMORPHOUS FLUORINE-CONTAINING RESIN COMPOSITION AND A MANUFACTURING METHOD OF THIN FILMS

TECHNICAL FIELD

This invention is related to an amorphous fluorine-containing resin composition that dissolves the amorphous fluorine-containing resin in a fluorinated solvent, and is related to a manufacturing method of thin films.

TECHNOLOGY BACKGROUND OF THE INVENTION

Among other fluorine resins, because the perfluoro polymer that is particularly represented by the copolymer (PFA) of tetrafluoroethylene (TFE) and perfluoro (alkyl vinyl ether) and (PAVE) has the characteristics of superior heat resistance, chemical resistance, purity, dielectric constant and so on, this polymer is used for melt-molding of piping for transporting various chemicals, joints of piping, transportation containers, storage containers, pumps and filter housings, and so on in chemical plants and semiconductors or the manufacturing process of the liquid products; and is used for lining electronic boards, steel pipes, pulps, fittings and so on.

However, because generally these perfluoro polymers are insoluble, these polymers are being used in various applications in the method of so-called hot melt molding.

In order to give the characteristics of this fluorine resin to various base materials, attempts were made to dissolve the amorphous fluorine resin in a solvent. For example, it has been proposed that the amorphous tetrafluoroethylene copolymer is dissolved and dispersed in the monoalkoxy-substituted solvent of the perfluoroalkane and so on, to be the composition of the coatings. Moreover, it has been proposed that the amorphous fluorine-containing resin that has the fluorine-containing aliphatic cyclic structure in the main chain is dissolved in a specific perfluoro solvent, for example, perfluoro (2-butyl tetrahydrofuran); and then the thin films of the fluorine-containing polymer free from pinholes can be formed from the perfluoro solvent solution of this fluorine-containing polymer. (Patent document 1, Patent document 2, and Patent document 3).

However, the fluorine-containing solvents of perfluoroalkane, hydrofluorocarbon, hydrofluoroether, and so on that are used in the prior art have high global warming potential, and cannot satisfy the requirements from the perspective of the efforts to protect the global environment (refer to Table 1 mentioned below).

DOCUMENTS OF PRIOR ART

Patent Document

[Patent document 1] Patent Application Publication No. 2000-355677
[Patent document 2] Published Examined Patent Application No. 8-22929
[Patent document 3] U.S. Pat. No. 3,968,899
[Patent document 4] U.S. Patent Publication No. 2011/0282104

SUMMARY OF THE INVENTION

The Problems to be Solved by this Invention

Therefore, in order to solve the above mentioned problems, as a result of the extensive studies, the inventors of this invention had found out the amorphous fluorine-containing resin composition that has superior film-forming ability, and has a small impact on the global environment because it has very small global warming potential, and can fully satisfy the requirement from the perspective of the environmental protection of the earth; and thus this invention was achieved.

That is to say, this invention provides an amorphous fluorine-containing resin composition that has superior film-forming ability, and has a small impact on the global environment.

Means to Solve the Problems

The inventors of this invention had found out that by using alkoxy fluoroalkene as the solvent, the amorphous fluorine-containing resin composition that has improved film-forming ability, and has a small impact on the global environment owing to its very small global warming potential, and can fully satisfy the requirement from the perspective of the environmental protection of the earth could be obtained; and thus this invention was achieved.

That is to say, this invention provides an amorphous fluorine-containing resin composition that dissolves the amorphous fluorine-containing resin in alkoxy fluoroalkene.

The preferable embodiment of this invention is the above mentioned amorphous fluorine resin composition having the heat of fusion of the above mentioned amorphous fluorine-containing resin of less than 3 J/g when measured at a heating rate of 10° C./min by a differential scanning calorimetry (DSC).

This invention further provides the method to form the thin films of the amorphous fluorine-containing resin on the base materials by applying the above mentioned amorphous fluorine resin composition on the base materials, followed by drying.

Moreover, this invention provides an article that contains a coating that is formed from the thin films that are made from the above mentioned amorphous fluorine resin composition.

Effect of the Invention

Through the amorphous fluorine-containing resin composition and the manufacturing method of that thin film, it is possible to obtain the article that is coated by the amorphous fluorine-containing resin wherein the thin films of the amorphous fluorine-containing resin is formed on the surface of the article without giving any adverse impact to the global warming, the used solvent is removed immediately from the surface of the thin films, causing no damage to the surface of the covered article by hot air, and so on.

Through this invention, the amorphous fluorine-containing resin composition that dissolves the amorphous fluorine-containing resin in alkoxy fluoroalkene is provided.

Embodiments to Execute this Invention

In accordance with this invention, the amorphous fluorine-containing resin composition that dissolves the amorphous fluorine-containing resin in alkoxy fluoro alkene and the manufacturing method of that thin film are provided.

Solvent of this Invention

In the amorphous fluorine-containing resin composition of this invention, alkoxy fluoroalkene is fluoroolefin that has an alkoxy group and a double bond.

The alkoxyl group is preferably the alkoxyl group with 1-5 carbon atoms, and is more preferably the methoxy group or the ethoxy group with 1 or 2 carbon atoms.

It is desirable for the carbon number of fluoroalkene to be 2-10, with 5-8 being more preferable.

The preferable embodiment of this invention is the amorphous fluorine-containing resin composition wherein ethoxy fluoroalkene or methoxy fluoroalkene having the carbon number of the fluoroalkene of 2-10, preferably 5-8 is used as the solvent.

For the preferable example of alkoxy fluoroalkene, alkoxy perfluoroalkene can be mentioned. The perfluorinated alkene refers to the compound wherein hydrocarbon that has 1 double bond, all the hydrogen atoms are substituted by fluorine.

For the alkoxy perfluoroalkene of this invention, the carbon number of perfluoroalkene is preferably 2-10, and the carbon number is more preferably 5-8.

For the preferable examples of alkoxy perfluoroalkene, methoxy perfluoroalkene of methoxy perfluoropentene, methoxy perfluorohexane, methoxy perfluoroheptene, methoxy perfluorooctene, and so on; and ethoxy perfluoroalkene of ethoxy perfluoropentene, ethoxy perfluorohexane, ethoxy perfluoroheptene, ethoxy perfluorooctene, and so on may be mentioned as the examples.

Although there are multiple structural isomers in the alkoxy perfluoroalkene, there are no particular limitation on the structure, the mixture of those isomers can also be accepted, and it is possible to appropriately select the structure that is suitable for the purposes of this invention. For example, for the structure of methoxy perfluoroheptene, although the following examples are mentioned, any structure can be accepted, and the mixture of these isomers can also be accepted. In the case when selecting from the structural isomers of alkoxy perfluoroalkene, it is desirable to select the material that is more nonflammable.

$$CF_3(CF_2)_2CF{=}CFCF(OCH_3)CF_3 \quad (1)$$

$$CF_3CF_2CF{=}CF(CF_2)_2(OCH_3)CF_3 \quad (2)$$

$$CF_3CF_2CF{=}CFCF(OCH_3)CF_2CF_3 \quad (3)$$

$$CF_3CF{=}CFCF(OCH_3)(CF_2)_2CF_3 \quad (4)$$

$$CF_3CF{=}CFCF_2CF(OCH_3)CF_2CF_3 \quad (5)$$

$$CF_3CF_2CF{=}C(OCH_3)(CF_2)_2CF_3 \quad (6)$$

$$CF_3CF_2C(OCH_3){=}CFCF_2CF_2CF_3 \quad (7)$$

The preferable embodiment of this invention is the amorphous fluorine-containing resin composition wherein alkoxy perfluoroalkene or methoxy perfluoroalkene of which the carbon number of the perfluoroalkene is 2-10, preferably 5-8 is used as the solvent. In these compositions, the amorphous fluorine-containing resin composition wherein the methoxy perfluoroheptene is used as the solvent is more preferable.

Moreover, the amorphous fluorine-containing resin composition may be used alone, and may also be used as a mixture. In addition, because when manufacturing the thin films for the surface of the article, the workability is improved by performing the work at a high temperature within the range that does not damage the surface of the covered article, it is preferable to select alkene with higher boiling point from alkoxy fluoroalkenes of this invention.

[Manufacturing Method of Alkoxy Perfluoroalkene]

In this invention, for the manufacturing method of the alkoxy fluoroalkene that is used as the solvent for the amorphous fluorine-containing resin composition, the alkoxy perfluoroalkene that is the preferred example is introduced below as a representative example. The manufacturing method is not limited to these examples.

The alkoxy perfluoroalkene can be obtained by distilling the product that is generated from the reaction for about 2 hours, wherein in the perfluoroalkene that can be manufactured by the following method, in the presence of the strong base such as KOH and so on, alcohol and a small amount of water is added to conduct an exothermal reaction. To be more specific, through the method that was described in Patent Document 4, by selecting perfluoroalkene as the appropriate reactant and alcohol to conduct the reaction, various types of alkoxy perfluoroalkenes, that is to say, methoxy perfluoropentene, methoxy perfluorohexane, methoxy perfluoroheptene, or methoxy perfluorooctene, and ethoxy perfluoropentene, ethoxy perfluorohexane, ethoxy perfluoroheptene or ethoxy perfluorooctene and so on can be manufactured.

[Optional Components]

In the amorphous fluorine-containing resin composition of this invention, corresponding to the necessity within the range of not impairing the purpose of this invention, the following components in addition to alkoxy fluoroalkene such as the solvents, the stabilizers, and so on can be added.

As the solvent in addition to alkoxy fluoroalkene, at least more than one type of solvent selected from, for example, hydrocarbons, alcohols, ketones, ethers, esters, and so on can be used alone or in combination. If these mixtures form an azeotropic composition, because the mixture can be removed together with the solvent of this invention, it is more preferable.

In the case when the solvent in addition to alkoxy fluoroalkene is flammable, because when mixing a large amount of the solvents, the whole composition will become flammable, it is preferable to use within the range that considered the flammability.

For the stabilizer, at least one type selected from nitroalkanes, such as nitromethane, etc., epoxides such as propylene oxide, etc., furans, benzotriazoles, phenols, amines, and so on can be mentioned as examples.

[The Amorphous Fluorine-Containing Resin]

The amorphous fluorine-containing resin in this invention is the resin wherein any heat of fusion of the resin that is detected out by a differential scanning calorimetry (DSC) is less than 3 J/g; only weak heat-absorption is detected even during the heating at the beginning, but no heat-absorption can be observed during the second time of DSC heating.

In the amorphous fluorine-containing resin composition of this invention, for the amorphous fluorine-containing resin, the copolymer that at least contains tetrafluoroethylene (TFE) and is composed of other comonomers that contains fluorine is preferable. In that copolymer, the amount of other fluorine-containing comonomers that are contained is the amount that gives the amorphous nature to the fluorine-containing resin.

In addition, it is also possible to select from what is known as the amorphous fluorine-containing resins or the perfluoro elastomers that are available on the market for use.

For the examples of the amorphous fluorine-containing resin of this invention, the copolymer of 1-70 wt % tetrafluoroethylene and 99-30 wt % perfluoro (alkyl vinyl ether), the copolymer of tetrafluoroethylene/perfluoro(butyl vinyl ether), the copolymer of tetrafluoroethylene/perfluoro dimethyl dioxole, the copolymer of tetrafluoroethylene/ $CF_2{=}CFOCF_2CF(CF_3)OCF_2CF_2SO_2F$, and so on may be mentioned as the examples. For the preferable amorphous fluorine-containing resin of these resins, the copolymer of 1-70 wt % tetrafluoroethylene and 99-30 wt % perfluoro (alkyl vinyl ether) may be mentioned as the example.

For the resin that can be used as the amorphous fluorine-containing resin of this invention, the following examples described can be mentioned as concrete examples, but this invention is not limited these examples. From these examples, one type or more than two types that are suitable for the purpose of this invention can be appropriately selected for use.

(a) The copolymer (the TFE/PEVE copolymer) of 1-70 wt % tetrafluoroethylene and 99-30 wt % perfluoro (alkyl vinyl ether)

(b) Teflon (registered trademark) AF 1600 [product name, manufactured by DuPont Company, the copolymer of tetrafluoroethylene/perfluoro dimethyl dioxole, Tg=160° C.]

(c) Teflon (registered trademark) AF 2400 [product name, manufactured by DuPont Company, the copolymer of tetrafluoroethylene/perfluoro dimethyl dioxole, Tg=240° C.]

(d) Teflon (registered trademark) SF-60 [product name, manufactured by DuPont Company, the copolymer of tetrafluoroethylene/perfluoro methyl vinyl ether/perfluoro ethyl vinyl ether]

(e) Teflon (registered trademark) SF-50 [product name, manufactured by DuPont Company, the copolymer of tetrafluoroethylene/hexafluoropropylene]

(f) Cytop [product name, manufactured by Asahi Glass Company, the copolymer of tetrafluoroethylene/perfluoro (butenyl vinyl ether)]

(g) The sulfonyl fluorides of Nafion (registered trademark) [manufactured by DuPont Company, the copolymer of tetrafluoroethylene/$CF_2$=$CFO$ $CF_2CF(CF_3)$ $OCF_2CF_2SO_2F$]

(h) Hyflon AD [product name, manufactured by Solvay Company, the copolymer of tetrafluoroethylene/perfluoro dimethyl dioxole]

[Preparation of the Amorphous Fluorine-Containing Resin Composition]

In the amorphous fluorine-containing resin composition that is obtained by dissolving the amorphous fluorine-containing resin in alkoxy fluoroalkene, the concentration of the amorphous fluorine-containing resin is preferably in the range of 0.01-10 wt %, and more preferably 0.5-5 wt %.

For the method of dissolving the amorphous fluorine-containing resin in alkoxy fluoroalkene, there is no particular limitation, the conventionally known methods can be adopted. At the time of dissolving the amorphous fluorine-containing resin in alkoxy fluoroalkene, it is possible to promote the dissolution if an ultrasonic treatment is performed.

For the amorphous fluorine-containing resin composition of this invention, it is also possible to mix and dissolve more than two types of amorphous fluorine-containing resins in accordance with the purpose of that use. The mixing ratio of the amorphous fluorine polymer is in the range of 0.1-99.9% of the total weight of the resin for one component, and 99.9-0.1% for the sum of other components.

[Method to Form Thin Films that Used the Liquid Composition of the Fluorine-Containing Polymer of this Invention]

Through drying after applying the amorphous fluorine-containing resin composition of this invention on the base materials, it is possible to form the thin films of the amorphous fluorine-containing resin on the base materials.

For the method of applying the amorphous fluorine-containing resin composition on the base materials, there is no particular limitation, the conventionally known methods can be adopted. For example, it is possible to use other dip methods, casting methods, roll coating methods, spin coating methods and so on in addition to the normal brushing and spraying methods. Through drying after applying, it is possible to form the thin films of the amorphous fluorine-containing resin on the base materials.

The obtained thin films can be used while the films are closely adhered on the base materials or are peeled from the base materials. The thickness of the thin films can be in the range of 1-30 μm by adjusting the concentration and the like of the dissolved amorphous fluorine-containing resin.

For the use of the obtained thin films, the pellicle films and so on in the manufacturing process of semiconductors, the protective films in electrical and electronic parts, optical parts, precision machinery parts, automotive parts and so on can be mentioned as the examples. For the base materials for the purpose of obtaining the thin films through peeling from the base materials, the flat plate-like shapes that are made from metals, resins and so on are preferable, but this invention is not limited those examples.

In the case when the thin films are used while the films are closely adhered on the base materials, as the subject of the base materials, wiring boards such as printed circuit boards, ceramic wiring board, etc.; optical fibers, solar cells, touch panel, film capacitors, liquid crystal, plasma display and other display components can be mentioned as examples.

As optical components, lenses that are used in glasses, cameras, and housings of the lenses can be mentioned as examples.

EMBODIMENTS

In the following paragraphs, the embodiments are given to further explain this invention in detail, but this invention is not limited to these embodiments.

The test of the physical properties in this invention was carried out by the following methods.

(1) Solubility 19.8 g fluorine-containing solvent and 0.2 g fluorine-containing resin were placed in the sample tube (50 mL), by an ultrasonic treatment over a period of about 180 minutes at 50° C., based on the combined weight of the resin and the solvent, 1 wt % composition was created. After the treatment, the composition was left standing for 10 minutes at 50° C., and then the state of the obtained composition was visually observed.

The state in the sample tube after the ultrasonic treatment was evaluated in accordance with the following criteria.
Soluble: cloudiness and precipitation cannot be observed
Insoluble: cloudiness and precipitation at the bottom can be observed (2) Film-Forming Ability On one side of the glass plate in the size of 76 mm×26 mm, 2 mL solution of the fluorine-containing resin was applied, after any excess solution was removed by tilting the glass plate at 90°, the plate was dried for 3 hours at 60° C., and then the state of the obtained coating film was visually observed.

The state of the coating film after drying was evaluated in accordance with the following criteria.
O: it was a good coating film
X: unevenness was observed The Table 1 shows the global warming potential and the boiling point of the fluorinated solvent that is conventionally used and the amorphous fluorine-containing resin composition of this invention. The value of the conventional fluorinated solvent was transcribed from the report that was published, while the value of the solvent of this invention was the value calculated by the applicant for methoxy perfluoroheptane, which is described in the following Embodiment 1. In addition, the (Global Warming Potential GWP) is based on the carbon dioxide, and refers to a number that indicates how much potential of global warming other greenhouse gas has; and GWP is an estimated value of the ratio of the integrated value (that is to say, the impact on global warming) of the radiation energy that is applied to the earth in a given period of time to $O_2$ at the time when the greenhouse gas in the unit mass is released into the atmosphere.

TABLE 1

Global Warming Potential

| Fluorine-containing solvent | Global Warming Potential | Boiling point |
|---|---|---|
| Methoxy perfluoroheptene | <10 (Note 2) | 110° C. |
| 1,1,1,2,3,4,5,5,5-decafluoropentane | 1,640 (Note 1) | 55° C. |
| Methoxy perfluorohexane $F(CF_2)_6OCH_3$ | 200 (Note 3) | 98° C. |

Note 1) 2007 Fourth Assessment Report from the Intergovernmental Panel on Climate Change (Abbreviated: IPCC)
Note 2) Calculated by the applicant
Note 3) From Table 2 of Patent Application Publication No. 2010-164043

Preparation Example 1

Preparation of the TFE/PEVE Copolymer (the Content of PEVE is 56 wt %)

In a one gallon (3.8 L) reactor, 2400 mL deionized water, the surfactant, and the polymerization initiator was used, 323 g PEVE was supplied, by the reaction with TFE, the dispersion solution of which the content of solid materials was 5 wt % was obtained. The generated copolymer was washed clean using the deionized water, and then dried for 1.5 hours at 150° C. The composition of the generated copolymer that was measured by 19 F-nuclear magnetic resonance (NMR) spectrum analysis was TFE/PEVE=44/56 by weight. The melting point of this TFE/PEVE copolymer was not detected by DSC, and the glass transition temperature was 20° C.

Embodiment 1

19.8 g methoxy perfluoroheptene, 0.2 g TFE/PEVE copolymer (the content of PEVE was 56 wt %) as the fluorine-containing polymer were placed in the sample tube (50 mL), by an ultrasonic treatment over a period of about 180 minutes at 50° C., based on the combined weight of the resin and the solvent, 1 wt % composition was created. The film-manufacturing ability of the obtained composition was tested. The results are shown in Table 2. It is understood that the fluorine-containing polymer was dissolved to form the solution.

The methoxy perfluoroheptene that was used was the mixture of the isomers, the constitution of the mixture of the isomers shown earlier herein was 49% isomer (3), 20% (4), 20% (7), 6% (6), and the remaining percentage for other isomers.

Embodiment 2

Teflon (registered trademark) AF 1600 as the fluorine-containing polymer was used, and the same procedures as Embodiment 1 were conducted. The results are shown in Table 2.

Embodiment 3

Teflon (registered trademark) AF 2400 as the fluorine-containing polymer was used, and the same procedures as in Embodiment 1 were conducted. The results are shown in Table 2.

Embodiment 4

19.8 g methoxy perfluoroheptene that was used in Embodiment 1, 0.1 g TFE/PEVE copolymer (the content of PEVE is 56 wt %) as the fluorine-containing polymer, and 0.1 g Teflon (registered trademark) AF 1600 were placed in the sample tube (50 mL), by the ultrasonic treatment over a period of about 180 minutes at 50° C., based on the combined weight of the resin and the solvent, 1 wt % composition was created. The film-forming ability of the obtained composition was tested. The results are shown in Table 2. It is understood that the fluorine-containing polymer was dissolved to form the solution.

Embodiment 5

The TFE/PEVE copolymer as fluorine-containing polymer (the content of PEVE is 56 wt %) as the fluorine-containing polymer and Teflon (registered trademark) AF 2400 were used, and the same procedures as Embodiment 4 were conducted. The results are shown in Table 2.

Comparative Example 1

1,1,1,2,3,4,5,5,5-Decafluoropentane as the solvent (manufactured by Dupont-Mitsui Fluorochemicals Co., Ltd., Vertrel (registered trademark) XF) was used, and the same procedures as Embodiment 1 were conducted. The results are shown in Table 2.

Comparative Example 2

1,1,1,2,3,4,5,5,5-Decafluoropentane as the solvent (manufactured by Dupont-Mitsui Fluorochemicals Co., Ltd., Vertrel (registered trademark) XF) was used, and the same procedures as Embodiment 2 were conducted. The results are shown in Table 2.

Comparative Example 3

Nonafluorobutyl methyl ether as the solvent (manufactured by 3M Company, Novec (registered trademark) HFE-7100) was used, and the same procedures as Embodiment 2 were conducted. The results are shown in Table 2.

TABLE 2 comparison of the solubility of the amorphous fluorine-containing resin composition

| | Solvent | Polymer | Solubility |
|---|---|---|---|
| Embodiment 1 | Methoxy perfluoroheptene | TFE/PEVE | Soluble |
| Embodiment 2 | Methoxy perfluoroheptene | Teflon AF 1600 | Soluble |
| Embodiment 3 | Methoxy perfluoroheptene | Teflon AF 2400 | Soluble |
| Embodiment 4 | Methoxy perfluoroheptene | TFE/PEVE, and Teflon AF 1600 | Soluble |
| Embodiment 5 | Methoxy perfluoroheptene | TFE/PEVE, and Teflon AF 2400 | Soluble |
| Comparative Example 1 | 1,1,1,2,2,3,4,5,5,5-decafluoropentane | TFE/PEVE | Insoluble |
| Comparative Example 2 | 1,1,1,2,2,3,4,5,5,5-decafluoropentane | Teflon AF 1600 | Insoluble |
| Comparative Example 3 | Nonafluorobutyl methyl ether | Teflon AF 1600 | Insoluble |

Embodiment 6-10

Test of the Film-Forming Ability

It is possible to form the uniform thin film without any pinholes by the method wherein the composition that was obtained in accordance with Embodiment 1-5 was applied on the glass plate, and then dried for 3 hours at 60° C. The state of the obtained coating film was visually observed. The results are shown in Table 3.

The state of the coating film after drying was evaluated in accordance with the following standard.
O: it was a good coating film
X: unevenness was observed

Embodiment 11

19.0 g methoxy perfluoroheptene and 1.0 g Teflon (registered trademark) AF 2400 as the fluorine-containing polymer were placed in the sample tube (50 mL), by the ultrasonic treatment over a period of about 180 minutes at 50° C., based on the combined weight of the resin and the solvent, 5 wt % solution was created. This solution was applied on the glass plate, and then dried for 3 hours at 100° C. The state of the obtained coating film was visually observed. The results are shown in Table 3.

Comparative Example 6-8

The dispersion solution that was obtained in accordance with Comparative Example 1-3 was applied on the glass plate, and then dried for 3 hours at 60° C. to form the thin films. The pinholes were observed in the obtained coating film. The results are shown in Table 3.

APPLICABILITY IN THE INDUSTRY

In accordance with this invention, the amorphous fluorine-containing resin composition that has superior film-forming ability and has a small impact on the global environment is provided.

In accordance with this invention, the amorphous fluorine-containing resin composition and the manufacturing method of that thin film are provided, wherein it is possible to form the thin films of the amorphous fluorine-containing resin in a way that the thin films of the amorphous fluorine-containing resin is formed on the surface of the article without giving any adverse impact to the global warming, the used solvent is removed immediately from the surface of the thin films, and no damage is caused to the surface of the covered article by the hot air, and so on.

By the method of using the amorphous fluorine-containing resin composition of this invention to form the thin films, which will have no adverse impact on the global warming, it is possible to utilize various characteristics of the amorphous fluorine-containing resin composition to form the thin films quickly on the surface of the target article.

In accordance with this invention, the amorphous fluorine-containing resin composition that dissolves the amorphous fluorine-containing resin in alkoxy fluoroalkene is provided.

The invention claimed is:
1. An amorphous fluorine-containing resin composition consisting essentially of amorphous fluorine-containing resin dissolved in methoxy perfluoroheptene, wherein said amorphous fluorine-containing resin is the copolymer of 1-50 wt % tetrafluoroethylene and 99-50 wt % perfluoro (ethyl vinyl ether), and wherein the heat of fusion of said

TABLE 3 comparison of the film-forming ability of the amorphous fluorine-containing resin composition

| | Solvent | Polymer | Film-forming ability | Film thickness (μm) |
|---|---|---|---|---|
| Embodiment 6 | Methoxy perfluoroheptene | TFE/PEVE | O | 2.0 |
| Embodiment 7 | Methoxy perfluoroheptene | Teflon AF 1600 | O | 5.0 |
| Embodiment 8 | Methoxy perfluoroheptene | Teflon AF 2400 | O | 5.0 |
| Embodiment 9 | Methoxy perfluoroheptene | TFE/PEVE, Teflon AF 1600 | O | 3.5 |
| Embodiment 10 | Methoxy perfluoroheptene | TFE/PEVE, Teflon AF 2400 | O | 3.0 |
| Embodiment 11 | Methoxy perfluoroheptene | Teflon AF 2400 | O | 30.0 |
| Comparative Example 4 | 1,1,1,2,2,3,4,5,5,5-decafluoropentane | TFE/PEVE | X | — |
| Comparative Example 5 | 1,1,1,2,2,3,4,5,5,5-decafluoropentane | Teflon AF 1600 | X | — |
| Comparative Example 6 | Nonafluorobutyl methyl ether | Teflon AF 1600 | X | — | amorphous fluorine-containing resin is less than 3 J/g when measured at a heating rate of 10° C./min by differential scanning calorimetry.

2. The amorphous fluorine-containing resin composition as described in claim 1, wherein the amorphous fluorine-containing resin is 0.01-10 wt % of the composition.

3. A method of forming a thin film of amorphous fluorine-containing resin on a base material, comprising applying to said base material an amorphous fluorine-containing resin composition of claim 1 and drying the coated based material, thereby forming a thin film of said amorphous fluorine-containing resin on said base material.

4. An article that contains a coating that is formed from the composition as described in claim 1.

* * * * *